United States Patent
Barroso et al.

(10) Patent No.: US 8,609,329 B2
(45) Date of Patent: Dec. 17, 2013

(54) FRET-BASED ASSAY FOR SCREENING MODULATORS OF RECEPTOR CYCLING

(75) Inventors: Margarida Barroso, Clifton Park, NY (US); Ronak Talati, Vestal, NY (US)

(73) Assignee: Albany Medical College, Albany, NY (US)

( * ) Notice: Subject to any disclaimer, the term of this patent is extended or adjusted under 35 U.S.C. 154(b) by 787 days.

(21) Appl. No.: 12/026,413

(22) Filed: Feb. 5, 2008

(65) Prior Publication Data

US 2008/0227120 A1  Sep. 18, 2008

Related U.S. Application Data

(60) Provisional application No. 60/888,151, filed on Feb. 5, 2007.

(51) Int. Cl.
   *C12Q 1/00* (2006.01)
(52) U.S. Cl.
   USPC ............................................................. 435/4
(58) Field of Classification Search
   None
   See application file for complete search history.

(56) References Cited

PUBLICATIONS

Goldstein et al. (J. Biol. Chem., 250:7854-7862, 1975).*
Wallrabe et al. (Microsc. Res. Tech., 69:196-206, 2006).*
Brown et al. (Science, 232:34-47, 1986).*
Brown et al. PNAS, 71:788-792, 1974.*

* cited by examiner

*Primary Examiner* — Brian J Gangle
(74) *Attorney, Agent, or Firm* — Heslin Rothenberg Farley & Mesiti P.C.

(57) ABSTRACT

Automated FRET imaging of membrane-bound receptor/ligand complexes can discriminate between a clustered organization of ligand/receptor complexes that occurs during the early endocytic stages following internalization and a random distribution characteristic of late stage disassociation of ligand from the receptor. In the case of the low density lipoprotein receptor (LDL-R) and its ligand, LDL, this feature of FRET imaging forms the basis of an assay to monitor the endosomal release of cholesterol into the cell and identify compounds which alter pH in the endosome thereby inhibiting the disassociation of ligand and cholesterol from the receptor, a mechanism that is involved in regulation of plasma/serum cholesterol.

10 Claims, 11 Drawing Sheets

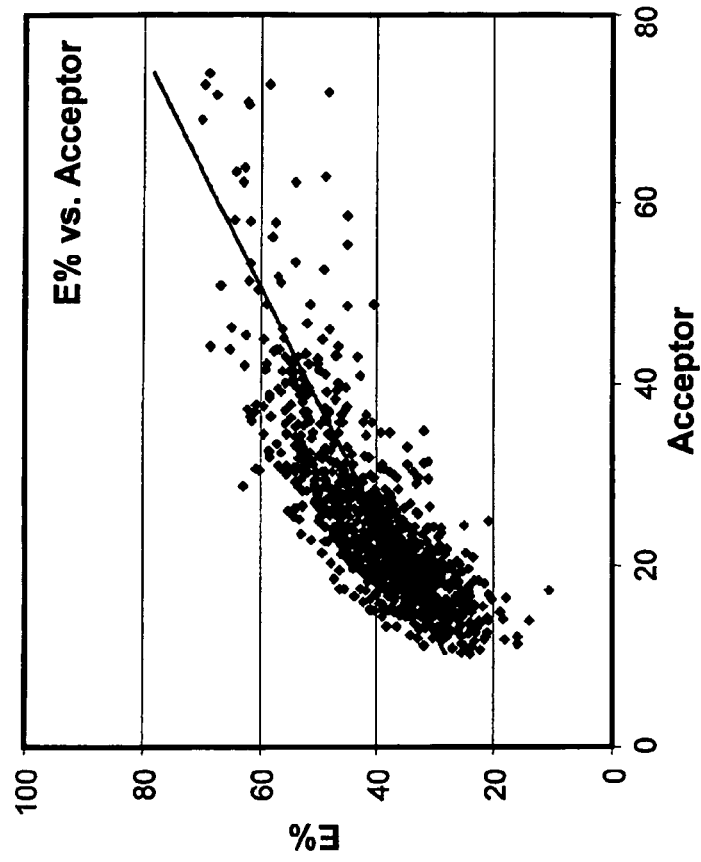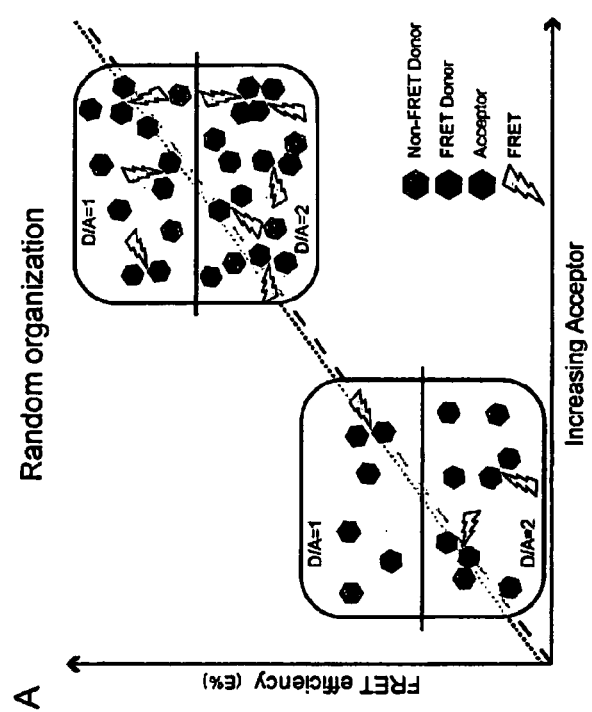
Figure 4

Figure 5A
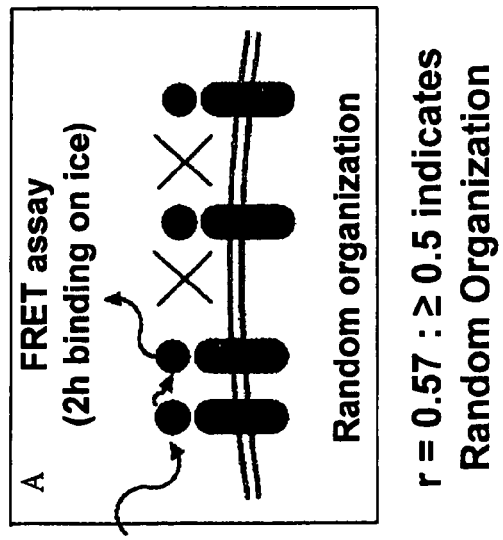
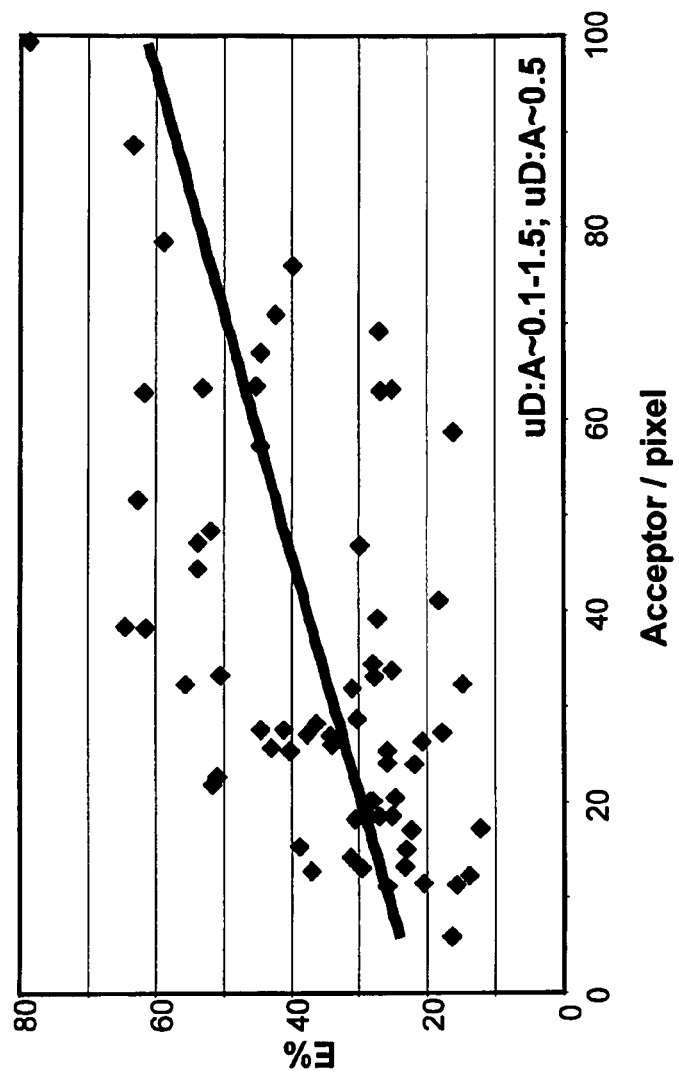

Figure 5B
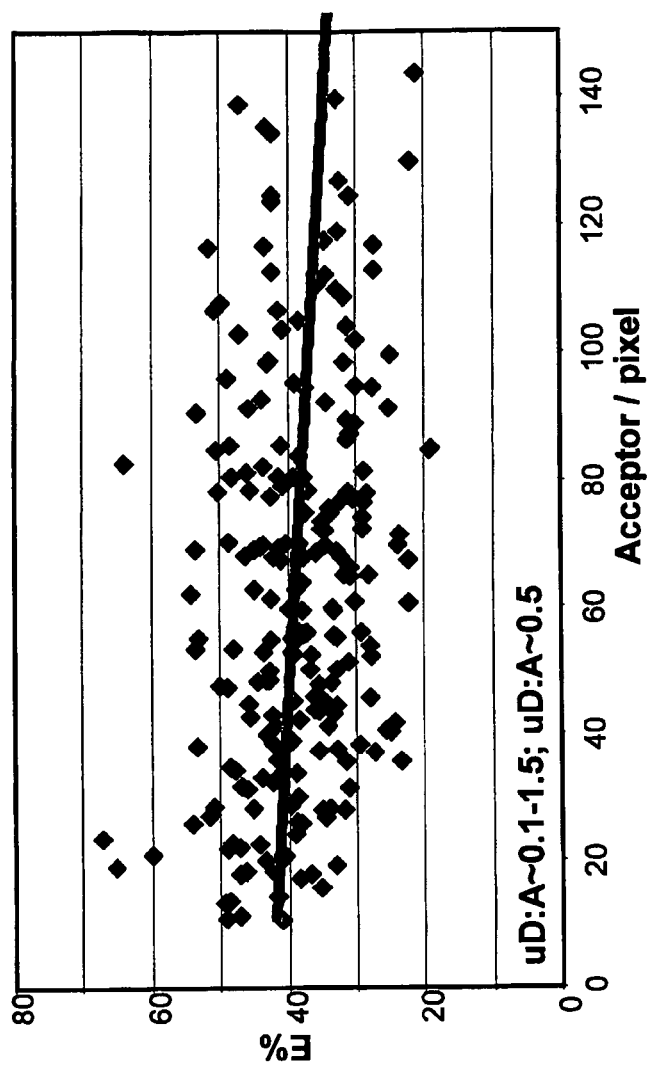
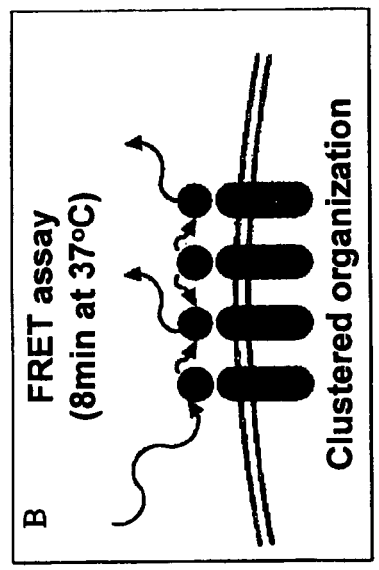

Figure 5C
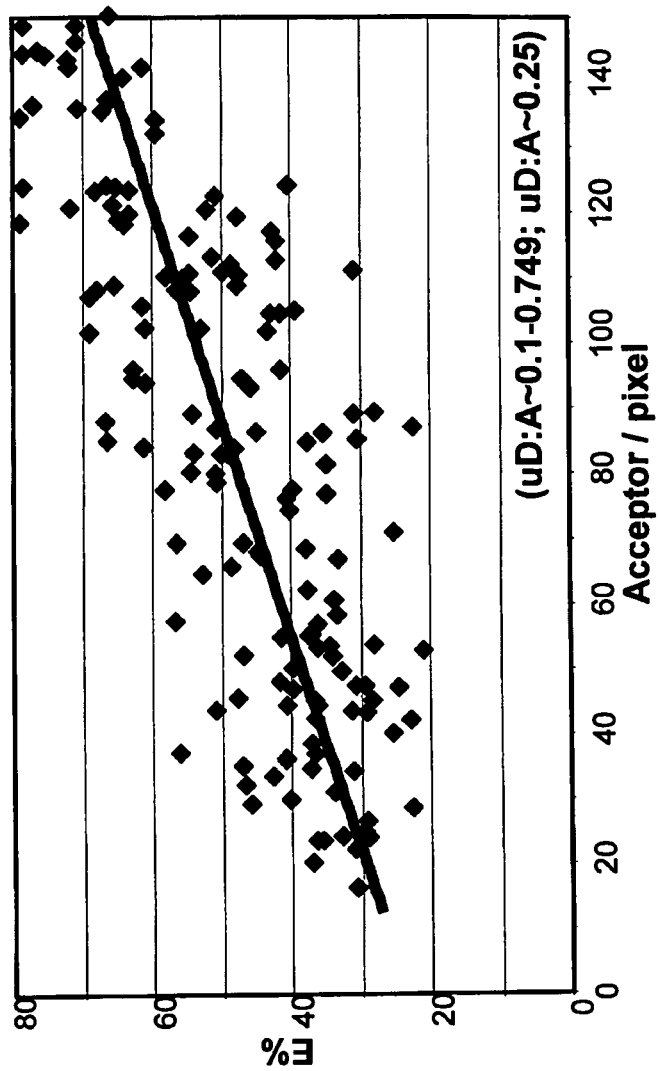
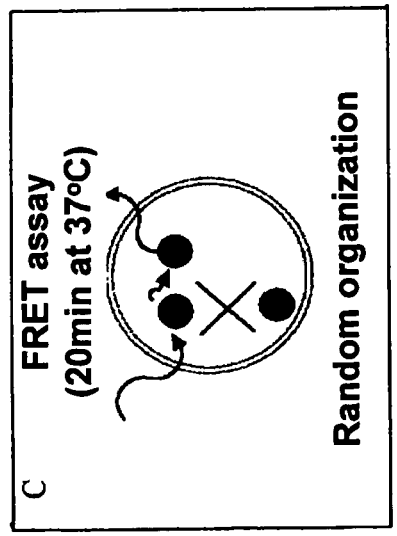

FRET-BASED ASSAY FOR SCREENING MODULATORS OF RECEPTOR CYCLING

CROSS-REFERENCE TO RELATED APPLICATIONS

This application claims priority to U.S. Provisional Application No. 60/888,151, filed Feb. 5, 2007, the disclosure of which is herein incorporated by reference in its entirety.

TECHNICAL FIELD

The present invention generally relates to FRET analysis of intracellular trafficking of receptor/ligand complexes. More particularly, the present invention relates to a method for the identification of compounds with potential therapeutic use as anti-hypercholesterolemic agents based on the ability of those compounds to modulate intracellular trafficking of the LDL receptor/LDL-cholesterol complex.

BACKGROUND OF THE INVENTION

The behavior of cholesterol and low density lipoprotein (LDL) is crucial to our understanding of heart and vessel disease (7-11). High levels of LDL-cholesterol (LDL-C) in the plasma indicate a higher risk of heart attacks, atherosclerosis and stroke. Currently, atherosclerosis control is achieved by treatment with commercially available statin drugs, which induce the up-regulation of LDL-receptor (LDL-R) expression via their ability to strongly inhibit HMG-coA reductase (10, 11, 40). However, increasingly lower LDL-C goals, growing target populations and significant variability and toxicity in the response to available LDL-C lowering therapies, have demonstrated the need for novel therapeutic strategies to lower LDL-C plasma levels (11, 31).

LDL-R is essential for cholesterol homeostasis and thus cardiovascular health, since it is involved in the cellular uptake of cholesterol-containing LDL. LDL-C binds to LDL-R at the plasma membrane then is taken into cells via LDL-R-mediated endocytosis and delivered to sorting endosomes. There a decrease in pH in the endosomal compartment induces the release of LDL-C from LDL-R. Whereas LDL-R is recycled back to the plasma membrane via recycling endosomes, free LDL-C is sent to the lysosomes for degradation and cholesterol release. Finally, LDL particles are degraded and free cholesterol is released into the cytoplasm where cholesterol can enter the membrane of the endoplasmic reticulum and inhibit the synthesis of LDL-R.

Recently, the proprotein convertase subtilisin kexin type 9 (PCSK9) has been identified as a promising drug target since reduced levels of PCSK9 lead to increased LDL-R expression and significant reduction of LDL-C plasma levels and atherosclerotic cardiovascular disease (15, 17, 26, 59). However, the lack of assays to analyze the intracellular membrane trafficking of LDL-R and LDL-C creates significant challenges to the development of therapeutic reagents (31).

Thus, a need exists for a drug screening assay that enables LDL-R and LDL-C trafficking within the cell to be visualized to identify potential cholesterol-lowering therapeutics that regulate plasma cholesterol by mechanisms related to intracellular trafficking of the LDL-R/LDL-C complex and subsequent upregulation of LDL-R expression.

SUMMARY OF THE INVENTION

The present invention provides a FRET-based assay for evaluating the intracellular trafficking of the LDL-R/LDL-C complex and subsequent release of LDL-C from the complex and for screening compounds with the potential to modulate intracellular LDL-C release and LDL-R levels, thereby providing lead candidates for therapeutic agents for lowering plasma cholesterol. Major advantages of the automated FRET assay of LDL-C trafficking technology of the invention are that it: (a) provides a novel assay for LDL-C release from LDL-R that does not require transfection of reporter molecules; (b) can be used with a variety of cell types that express LDL-R, either endogenously or exogenously; (c) can be used in live or fixed cells; (d) can be completely automated for use in high-content imaging drug screening assays; (e) requires only straightforward "mix & measure" cell protocols for internalization of fluorophore-labeled LDL-C.

In one aspect, therefore, the present invention relates to a method for identifying a compound that inhibits cholesterol release from its receptor, where the method comprises the following steps: providing a confluent or non-confluent monolayer of cells that have a low density lipoprotein receptor (LDL-R) in the plasma membrane (PM) of said cells; in the presence of a test compound, incubating said cells with low density lipoprotein-cholesterol (LDL-C) that is labeled, for a time sufficient for 1) binding of LDL-C to LDL-R to form a membrane-bound LDL-R/LDL-C complex and 2) internalization of the complex into said cells; determining by FRET-confocal microscopy whether LDL-R/LDL-C complexes in the membrane have a random distribution or a clustered distribution, wherein a clustered distribution indicates that a compound inhibits release of LDL-C from the receptor/ligand complex.

These, and other objects, features and advantages of this invention will become apparent from the following detailed description of the various aspects of the invention taken in conjunction with the accompanying drawings.

BRIEF DESCRIPTION OF THE DRAWINGS

FIG. 4 shows a random organization of BODIPY-LDL and DiI-LDL bound to a polylysine-coated cover slip.

FIG. 5 shows the membrane organization as evaluated with FRET of BODIPY-LDL and DiI-LDL (A) following binding to LDL receptor on the surface of a cell; (B) in the early endosome following internalization of the LDL-LDL-R complex into the cell; and (C) in the late endosome, following release of LDL from the receptor.

DETAILED DESCRIPTION OF THE INVENTION

Figure 1:
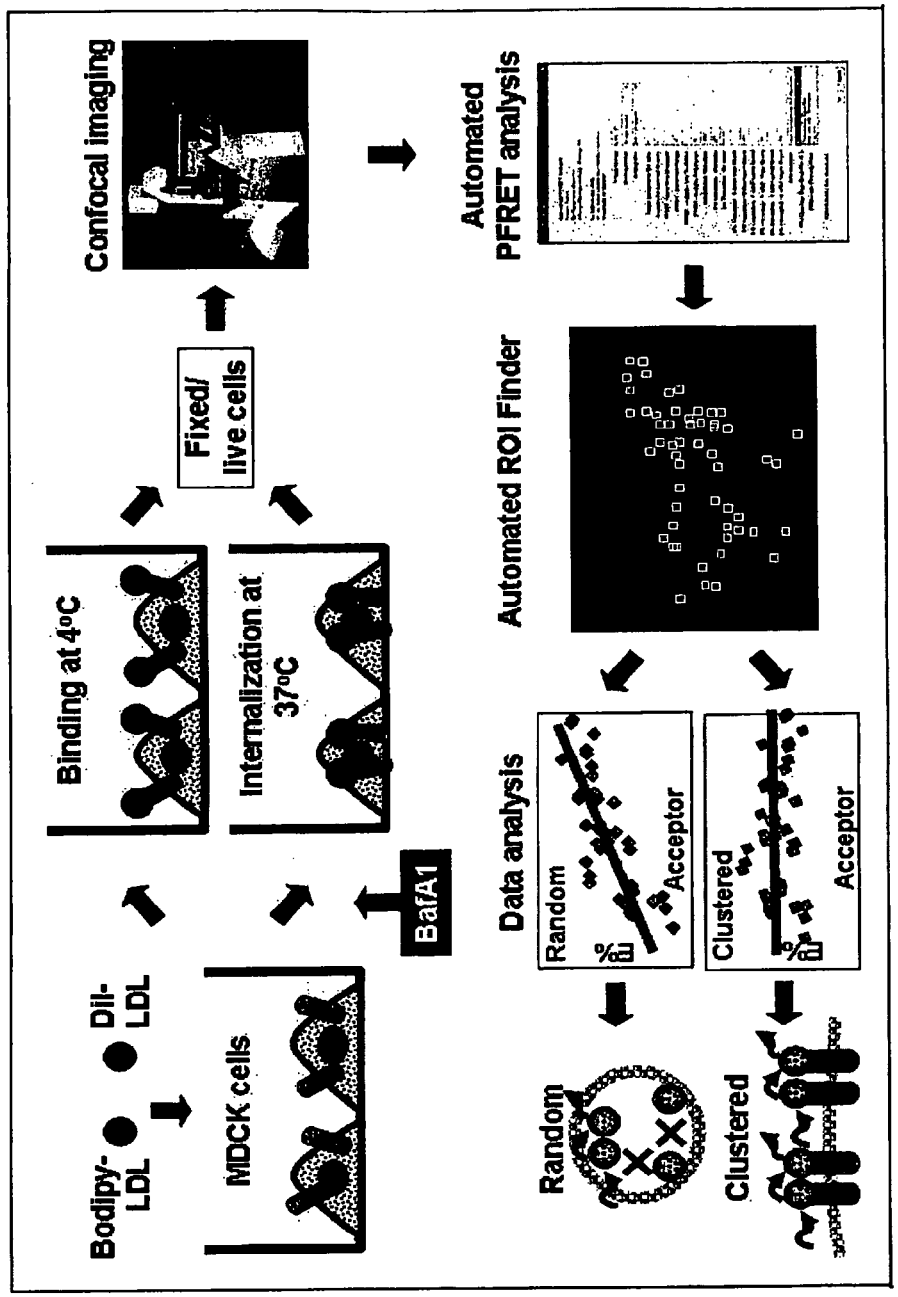
FIG. 1 is a schematic showing the steps of one embodiment of the method of the invention.

All patents, published applications and other publications or references that are listed herein are hereby incorporated by reference in their entirely into the present disclosure. In the description that follows, terms are intended to have the meaning that is consistent with the meaning ascribed to those terms by those of skill in the relevant art.

Membrane-bound receptors can be assembled in clusters, distributed randomly or occupy a position along a continuum between these two states (51). During early endocytic trafficking, following internalization via clathrin-coated pits, receptor-ligand complexes form clusters in endosomal membranes; such clustering is essential for membrane trafficking (38, 54, 55). Subsequently, these clusters undergo changes in their organization during their transport via endocytic pathways (51).

Due to its low resolution (~200 nm), fluorescence microscopy cannot unequivocally confirm co-localization when the staining pattern of two fluorophores appears to be overlapping. In contrast, FRET confocal microscopy, which monitors the transfer between two fluorophores (Donor, D, and Acceptor, A) less than 10 nm apart (56), has been used to provide further insight into the organization and distribution of fluorophore-labeled membrane-bound receptor-ligand complexes, such as polymeric IgA-receptor (pIgA-R) and transferrin-receptor (Tfn-R) (38, 51-55, 57).

A quantitative FRET analysis uses the efficiency of the energy transfer (E %) and its relationship to donor (D) and acceptor (A) fluorescence intensities to establish whether the close proximity between membrane proteins is due to random association or specific nonrandom clustering (51-55.)

The automated FRET imaging of LDL-R and LDL-C trafficking can discriminate between a clustered organization during the early endocytic steps, indicating that LDL-R/LDL-C complexes have been internalized into the cell, and a random distribution in the late endocytic steps, which indicates that LDL-C has been released from LDL-R and can randomly interact with other LDL-C particles in the lumen of late endosomes and lysosomes. In the present invention, this ability of FRET imaging to discriminate random from clustered distributions of membrane-bound receptor complexes is exploited to evaluate potential drug candidates' ability to modulate the clustering or random distribution of fluorophore-labeled LDL-C and/or LDL-R/LDL-C complexes during endocytic trafficking (16, 51, 54, 55, 57). Exposure to an agent that inhibits the pH-mediated release of LDL-C from its receptor, for example, inhibitors of vacuolar ATPases, such as bafilomycin A1 or concanamycin A, alters the release of LDL-C from the LDL-R resulting in a clustered distribution rather than a random distribution in the late endocytic stages. Therefore, automated FRET imaging provides a direct and novel assay of the pH-mediated release of LDL-C during endocytic trafficking.

Following the scheme shown in FIG. 1, the organization of the LDL-R/LDL-C complex following internalization is determined in the absence and presence of a compound to be screened in one embodiment of the invention. Briefly, using confocal microscopy, live-cell FRET images are collected from different cell types co-internalized with LDL-C-BODIPY (Donor) and LDL-C-DiI (Acceptor). FRET can occur between LDL-C BODIPY and LDL-C-DiI due to the significant spectral overlap between LDL-C-BODIPY's emission and LDL-C-DiI's absorption spectra. The energy transfer efficiency, E %, is calculated as described below and the relationship of E % to the A fluorescence intensity levels provides information about the organization of LDL-R and LDL-C during endocytic trafficking (38, 51-55, 57).

The spectral overlap, which makes FRET possible, also leads to FRET signal contamination, i.e., spectral-bleedthrough (SBT) upon donor excitation. A Precision FRET (PFRET) algorithm was developed to remove the SBT contamination from FRET images using single-label reference samples (16). The PFRET correction algorithm also calculates the energy transfer efficiency (E %) for different ROIs in each image (16). To make the assay compatible with a high content/high throughput screening methodology, an integrated ImageJ plugin was developed to perform the automated processing and analysis of the FRET images previously collected (subject matter of copending U.S. patent application Ser. No. 11/769,036 entitled "Methods and apparatuses for analyzing digital images to automatically select regions of interest thereof", filed Jun. 27, 2007) (48).

Figure 2:
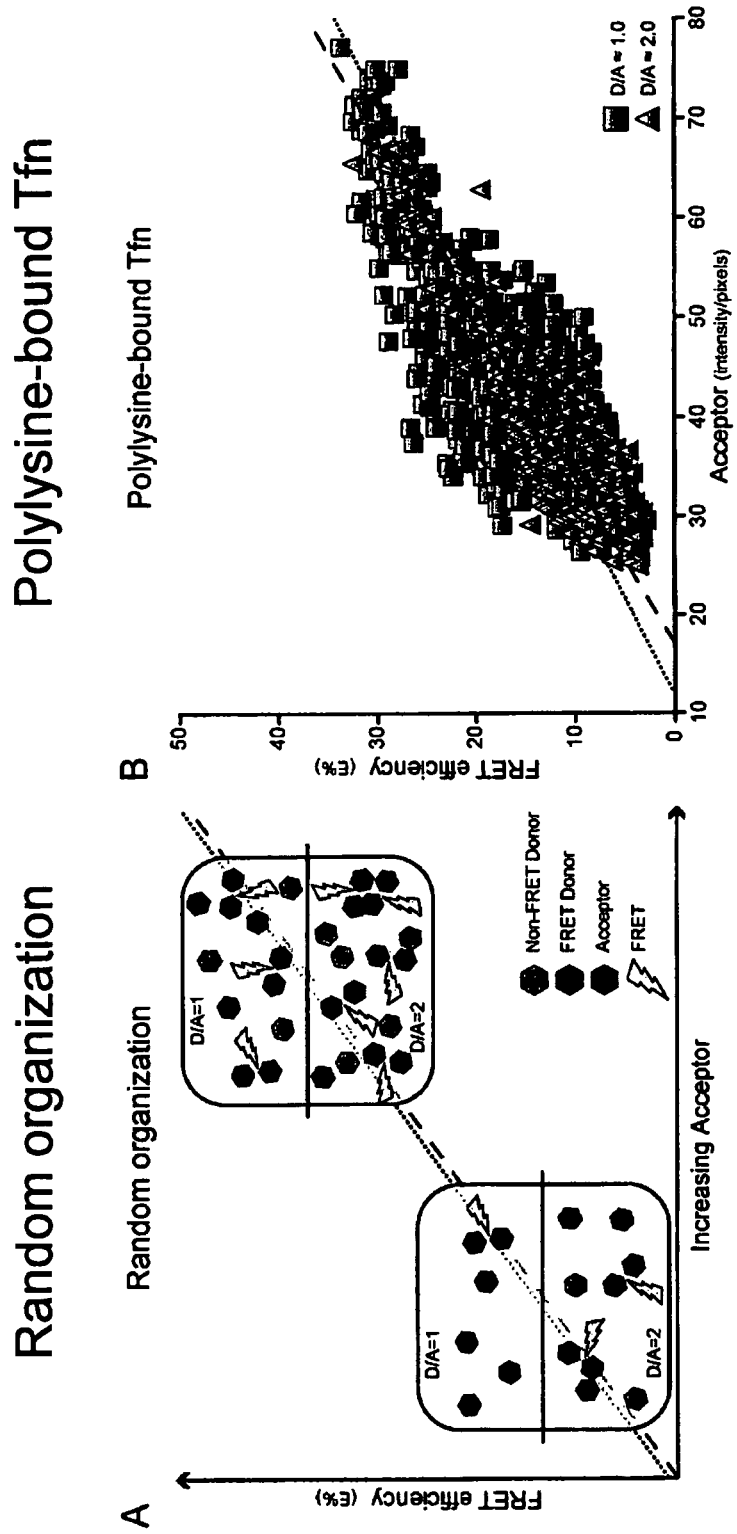
FIG. 2 shows FRET data that correlates with a random distribution of FRET-labeled transferrin molecules bound to a polylysine-coated cover slip.

To allow for a clear distinction between a clustered and a random ("molecular crowding") distribution, well-established controls have been characterized using FRET imaging analysis (51). As a control for random distribution, A- and D-labeled transferrin (Tfn) molecules were bound to polylysine-covered substrates (shown in FIG. 2). According to the quantitative FRET-based models for the organization of proteins in membranes, in a random "molecular crowding" distribution, E % is dependent on acceptor levels and independent from D:A.

Figure 3:
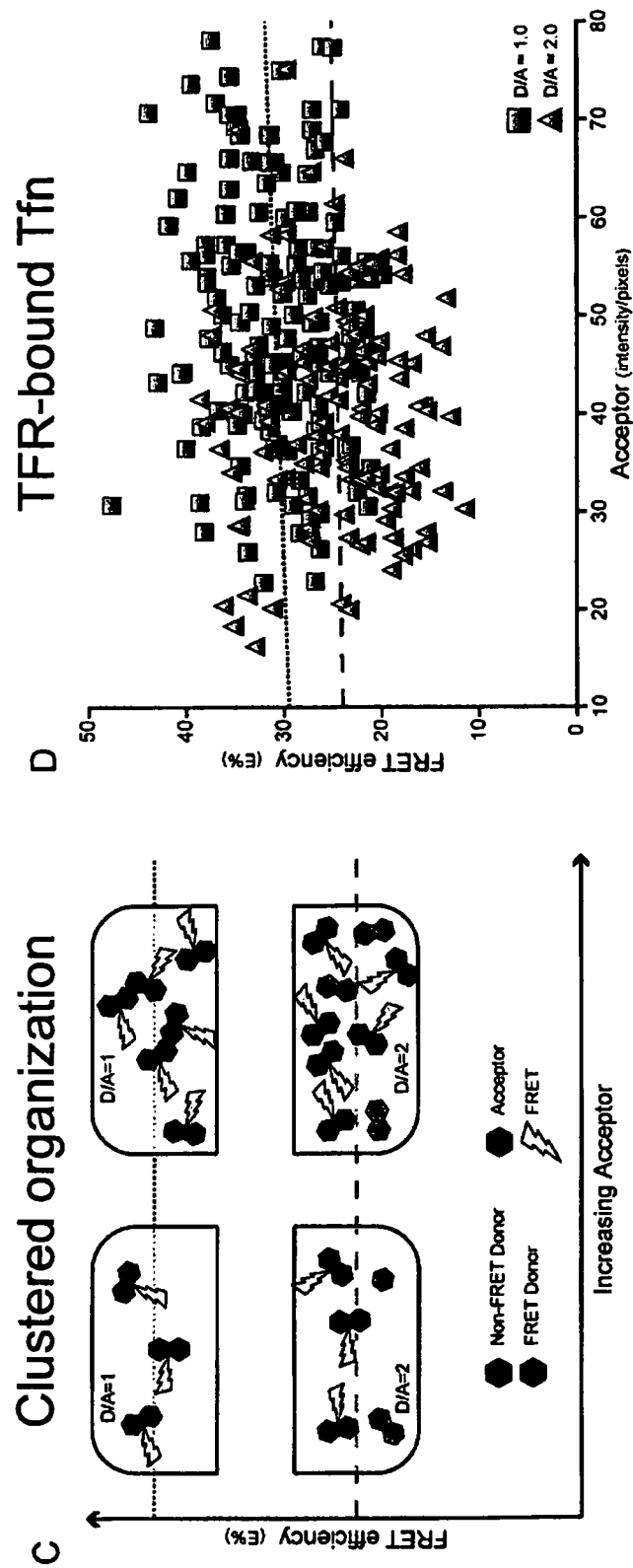
FIG. 3 shows FRET data that correlates with a clustered distribution of membrane-bound transferrin receptor-bound transferrin molecules.

Alternatively, transferrin was bound to transferrin receptor (TFR), a well-known homo-dimeric membrane-bound receptor, at the plasma membrane (38, 51, 54). In contrast to a random distribution, in a clustered organization (shown in FIG. 3), E % is independent from acceptor levels and negatively dependent on D/A (38, 51, 54, 55).

Consistent with these results, polylysine-coated coverslips to which LDL-C-DiI and LDL C-BODIPY were bound showed a random distribution, with E % levels rising with acceptor levels (FIG. 4). The correlation coefficient value, r-value, has been determined as the most statistical significant value to distinguish random (r<0.5) vs. clustered distributions (r≥0.5) (51, 54, 55).

In one embodiment of the invention, therefore, cells expressing LDL-R on their surface either endogenously or as a result of transient or stable transfection, are incubated with LDL-C that is labeled with a fluorophore suitable for FRET analysis. Cells that are useful in the assay of the invention include, but are not limited to, epithelial renal MDCK (5, 35, 55), hepatic HepG2 (42) and WIF-B (14, 19) cells (available from the American Type Culture Collection, ATCCO, Manassas, Va.) Cells that do not endogenously express the LDL-R may be modified to do so in accordance with transfection protocols known to those of skill in the art.

In some embodiments of the present invention, live-cell FRET is performed on cells overexpressing wild-type and mutant human LDL-R. Using methods known to those of skill in the art, cells are infected with adenoviruses expressing: β-galactosidase (AdβGal) as a control; LDL-R Y807A mutant that fails to localize in clathrin-coated pits due to its inability to bind the adaptor ARH (25) (negative clustering control at the cell surface); LDL-R containing three mutations, H562Y, H586Y or H190Y, which binds LDL-C but cannot undergo low-pH induced release; this LDL-R mutant shows a reduced ability to recycle back to the plasma membrane (positive clustering control) (6, 49). Another important LDL-R mutant is the LDL-R D310E, which abolishes the binding of PCSK9 to LDL-R (PCSK9 negative control) (59).

Following culture of an appropriate cell type to obtain a confluent or non-confluent cell monolayer, cells are co-internalized with different amounts of human LDL-C ligands, for example, human LDL-C-DiI (acceptor) and LDL C-BODIPY (donor) ligands (Invitrogen). Wild-type and mutant PCSK9 proteins, e.g. loss-of-function R46L and gain-of-function D374Y, are expressed and purified, as described previously (17, 59). PCSK9 unlabeled proteins are added to the cells at 1-10 μg/ml during incubations with LDL-C labeled ligands (to follow LDL-R-LDL-C trafficking).

Fluorophores suitable for use in the current FRET-based assay are known to those of skill in the art. The spectroscopic properties that are considered in selecting workable FRET pairs include: sufficient separation in excitation spectra for selective stimulation of the donor, a significant overlap between the emission spectrum of the donor and the excitation spectrum of the acceptor to obtain efficient energy transfer and reasonable separation in emission spectra between donor and acceptor to allow independent measurement of the fluorescence of each fluorophore. Examples of fluorophore pairs (donor-acceptor) suitable for use in the instant method include, but are not limited to cyan fluorescent protein (CFP)-yellow fluorescent protein (YFP), CFP-red fluorescent protein from *Discosoma striata* (dsRED), blue fluorescent protein (BFP)-green fluorescent protein (GFP), GFP- or YFP-dsRED, cyanine dye 3 (Cy3)-cyanine dye 5(Cy5), ALEXA FLUOR 488 ALEXA FLUOR 555, ALEXA FLUOR 488-Cy3, fluoroscein isothiocyanate (FITC)-tetramethyl rhodamine isothiocyanate (TRITC), YFP-TRITC or Cy3, BODIPY-1,1'-dioctadecyl-3,3,3'3'-tetramethylindocarbocyanine perchlorate (DiI).

LDL-BODIPY and LDL-DiI are commercially available, for example, from Invitrogen (Carlsbad, Calif.). LDL-C can be labeled with fluorophores of a suitable donor acceptor pair in accordance with manufactures' directions. Alternatively, prelabeled LDL-C is commercially available, for example, from Invitrogen (Carlsbad, Calif.).

Reagents are tested in three different assays: 1) LDL-C-BODIPY/LDL-C-DiI bound to polylysine-covered coverslips (random distribution control assay); 2) LDL-C-BODIPY/LDL-C-DiI internalized into cells (primary screen); and 3) Alexa Fluor 488-Tfn/Alexa Fluor 555-Tfn bound to TFR and internalized into cells (clustered distribution control screen) (38, 51, 54, 55). Clustered and random distribution controls without reagent treatment provide FRET parameters to discriminate between random and clustered distribution, corresponding to 100% positive and negative controls. Reagent treatment affects specifically the organization of LDL-R and LDL-C in cells but not in polylysine-covered coverslips; moreover, it should not affect the organization of Tfn-R-Tfn complexes in cells, which indicate general effects on endocytosis and recycling.

Cells expressing the LDL receptor are incubated with labeled LDL-C for a time sufficient for binding of LDL-C to receptor, for example between 30 minutes to 3 hours at 4° C. in the presence or absence of the compound to be assayed. The cells are then incubated for a time sufficient for internalization of the LDL-R/LDL-C complex to occur, for example, between 5-60 minutes at 37° C. Cells expressing the LDL-R can also be internalized continuously for different amounts of time, between 5 and 60 min at 37° C.

FRET images are then collected from the cells co-internalized with, for example, LDL-C-BODIPY (Donor) and LDL-C-DiI (Acceptor) using confocal microscopy according to methods known to those of skill in the art.

Precision FRET (PFRET) algorithm (described in detail in Elangovan et al. *Characterization of one- and two-photon excitation fluorescence resonance energy transfer microscopy*. Methods 29:58-73, 2003 and incorporated herein by reference) is used to remove the SBT contamination from FRET images using single-label reference samples (16).

The PFRET correction algorithm also calculates the energy transfer efficiency (E %) for different ROIs in each image (16).

To allow for a clear distinction between a random "molecular crowding" and a clustered distribution, well-established controls have been characterized using FRET imaging analysis (51). As a control for random distribution, A- and D-labeled Tfn molecules are bound to polylysine-covered substrates or to the TFR, a well-known homo-dimeric membrane-bound receptor, at the plasma membrane (38, 51, 54). According to the quantitative FRET-based models for the organization of proteins in membranes, in a random "molecular crowding" distribution, E % is dependent on acceptor levels and independent from D/A. In contrast, in a clustered organization, E % is independent from acceptor levels and negatively dependent on D/A (38, 51, 54, 55). Consistently with these results, polylysine-coated coverslips bound to LDL-C-DiI and LDL C-BODIPY show a random distribution, with E % levels rising with acceptor levels (FIG. 4). The correlation coefficient value, r-value, has been determined as the most statistical significant value to distinguish random ($r<0.5$) vs. clustered distributions ($r\geq0.5$) (51, 54, 55).

LDL-C internalization into cells. In one embodiment, LDL-C-DiI (acceptor-A) and LDL-C-BODIPY (donor-D) are used to follow the intracellular trafficking of LDL-R in epithelial MDCK cells, which express LDL-R endogenously. LDL-R/LDL-C complexes are internalized and tracked spatially and temporally in fixed cells using confocal microscopy; importantly, fixation does not affect receptor clustering (51, 54, 55). LDL-C-DiI and LDL C-BODIPY are internalized into cells at different internalization ranges (20-100 μg/ml) and several D/A fluorophore ratios (1:2, 1:1 & 2:1).

MDCK cells were bound with LDL-C-BODIPY and LDL-C-DiI for 2 h at 4° C. or incubated for various times (5-8 min and 20-30 min) at 37° C. in the presence or absence of BafilomycinA 1 (BafA1), a specific vacuolar-type ATPase inhibitor. Images were collected using a LSM Zeiss 510META confocal microscope with 63×1.4NA oil lens, 512×512 pixel resolution, no filter, 2× zoom. Then images were processed using an integrated and automated ImageJ plugin, which includes background removal, PFRET algorithm, ROI selection and E % analysis (48).

Figure 6:
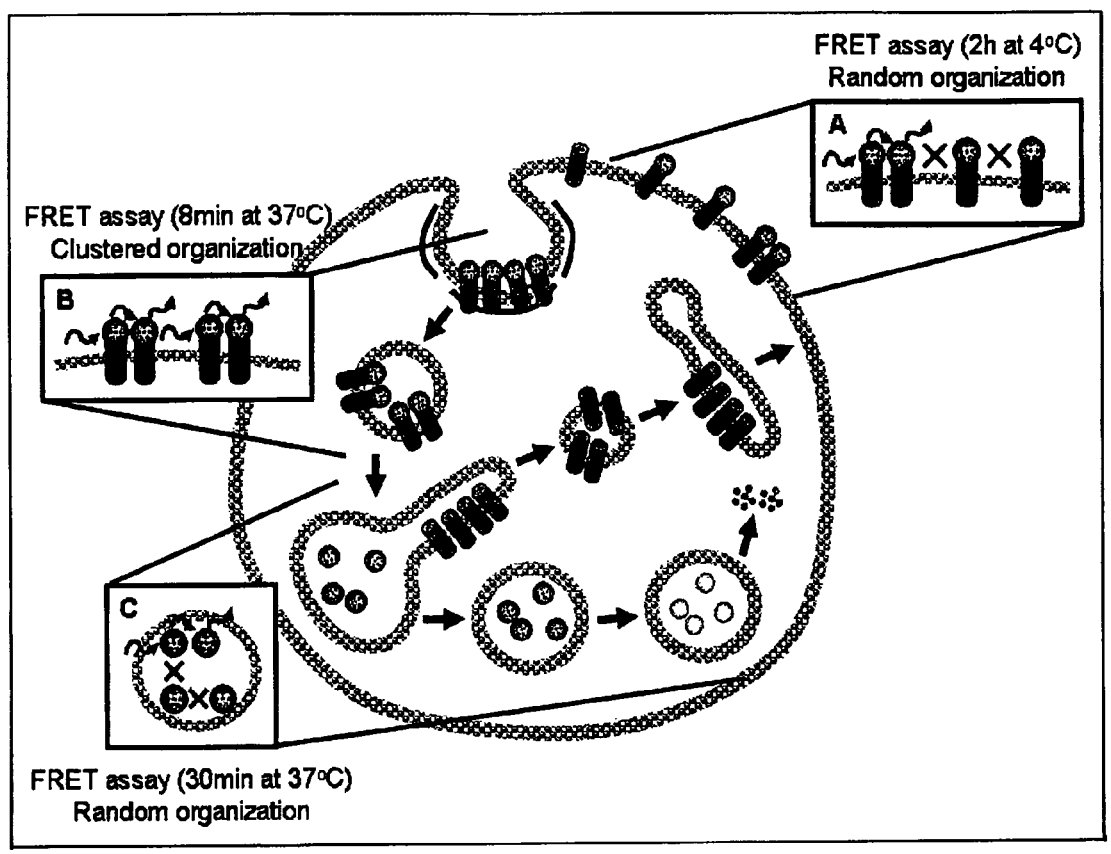
FIG. 6 shows the stages of LDL-C binding, internalization and travel through the endocytic pathway.

Firstly, LDL-C accumulates at the plasma membrane, upon binding of LDL-C-BODIPY and LDL-C-DiI to the surface LDL-R at 4° C. for 2 h. Automated FRET imaging shows that E % increases with rising acceptor levels (FIG. 5A), indicating that LDL-LDL-R receptor-ligand complexes are randomly distributed at the plasma membrane at 4° C. (FIG. 6A.) In agreement with our FRET-based results (FIGS. 5A and B), autoradiography and electron microscopy has shown that newly bound LDL-R-LDL-C complexes are randomized at the PM (13, 24, 41) and that internalization into clathrin-coated coated pits leads to the clustering of LDL-R-LDL-C complexes (19, 24, 23, 33).

Secondly, LDL-C shows a dispersed, punctuate distribution, which correlates with its location in the endocytic compartment, upon internalization into cells for different periods of time, such as 8 min and 30 min, at 37° C. Automated FRET imaging indicates that E % behaves independently from acceptor levels when LDL-C is internalized for 8 min (FIG. 5B), whereas E % shows a positive dependency on acceptor levels when LDL-C is internalized for 30 min (FIG. 5C). Therefore, upon clathrin-mediated internalization, LDL-R-LDL-C complexes show a clustered organization in the early internalization steps, e.g. early endosomes (FIG. 6B). In the late endosomes that are reached by LDL-C upon longer internalization periods, LDL-C undergoes a low pH-induced release from LDL-R and is delivered to the lysosomes, where its degradation occurs. A random organization of LDL-C particles indicates that LDL-C particles can randomly interact with each other in the lumen of the late endosomes, upon LDL-C release from LDL-R (FIG. 6C).

Figure 7:
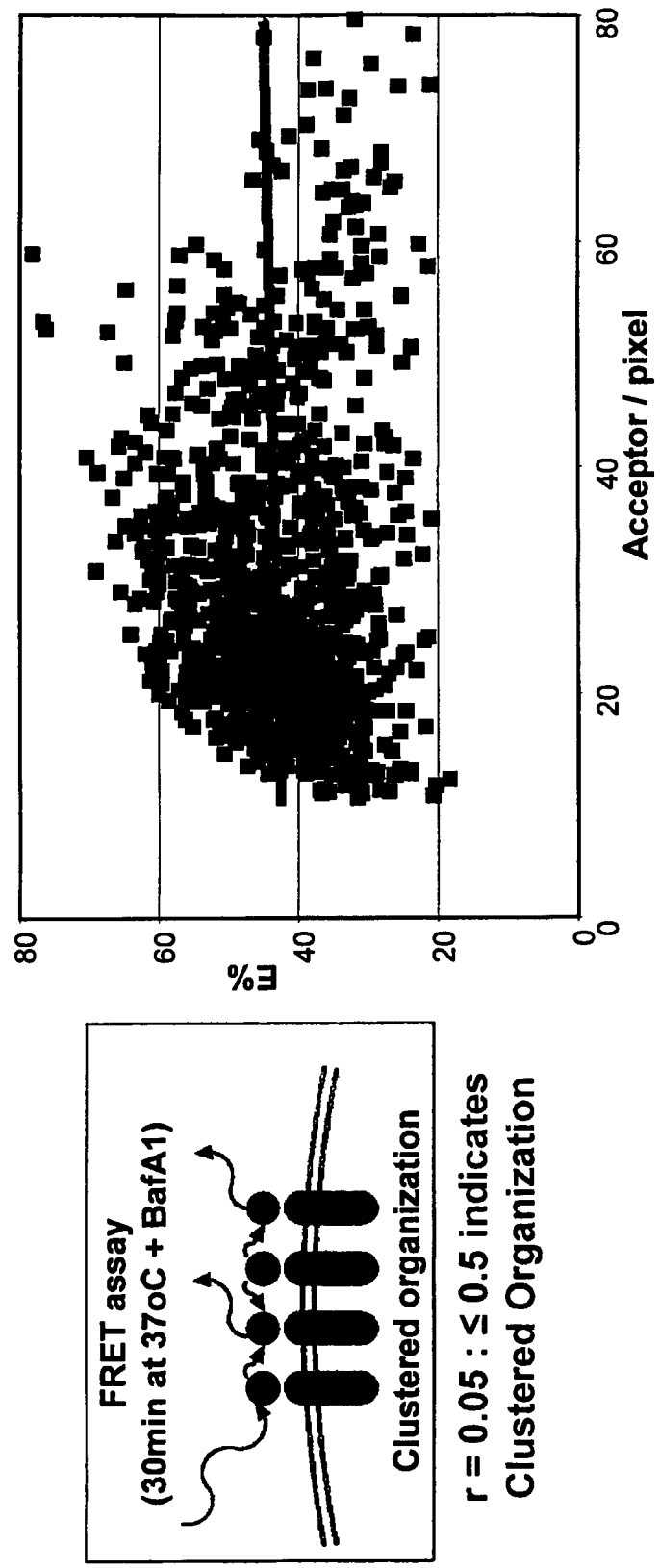
FIG. 7 shows the membrane organization as evaluated with FRET of BODIPY-LDL and DiI-LDL following internalization in the presence of Bafilomycin A1.
Figure 8:
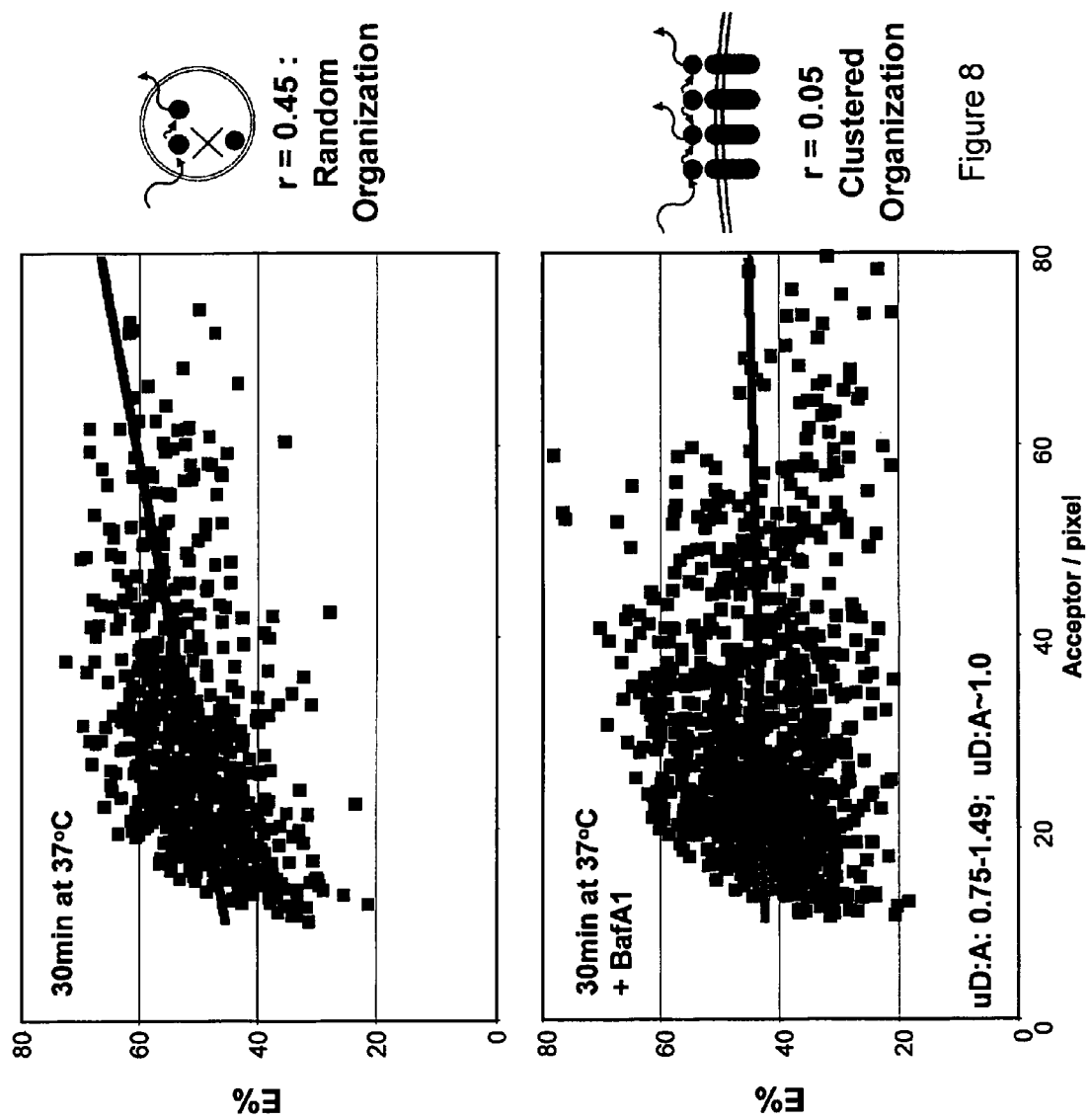
FIG. 8 is a comparison of the membrane organization of BODIPY-LDL and DiI-LDL in the presence and absence of Bafilomycin A1.
Figure 9:
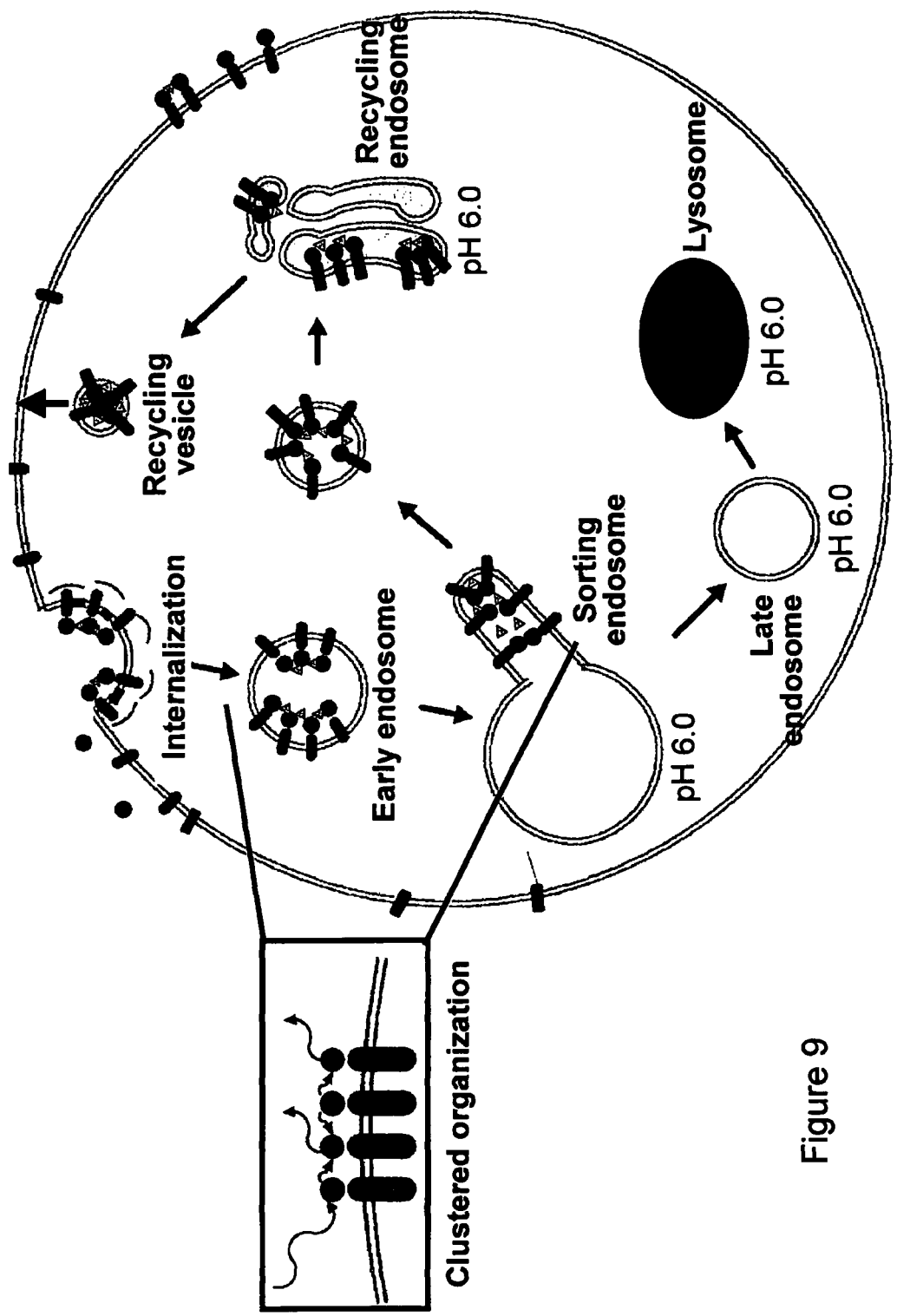
FIG. 9 shows the effect of pH neutralizing agents, like bafilomycin A1, on the endocytic pathway.

Thirdly, LDL-C is internalized at 37° C. for 30 min in the presence or absence of 100 nM BafA1, which blocks cholesterol trafficking due to its ability to neutralize the endocytic/lysosomal proton gradient (21). Since the acidification of the endocytic pathway is blocked by BafA1, the release of LDL-C from LDL-R during endocytic trafficking is prevented. Thus, automated FRET analysis was used to test whether BafA1 changes the behavior of LDL-C organization in the late steps of the endocytic pathway. In the absence of BafA1, E % shows a positive dependency on acceptor levels, suggesting that LDL-C shows a random organization in late endosomes (FIGS. 7 and 8). In contrast, in the presence of BafA1, E % shows a clear independency from acceptor.

In summary, blockage of endosome acidification by BafA1 induces a clustered organization of LDL-R-LDL-C complexes upon 30 min internalization at 37° C., suggesting that endocytic LDL-C remains bound to LDL-R. An interesting hypothesis is that the sequestration of cholesterol in endosomes may translate into a significant increase in LDL-R expression and higher LDL-C uptake and removal of cholesterol from the plasma.

The live-cell time-lapse automated FRET imaging can be performed in different cells types in the presence of reagents that not only disrupt endocytic pH (e.g. bafilomycin A), but also modulate cholesterol transport (e.g. statins) and LDL-R degradation (e.g. PCSK9) to assay LDL-C release and LDL-R recycling. The method is used to monitor dynamic changes in the organization of LDL-R and LDL-C during endocytic trafficking where a reagent alters normal trafficking, for example, in the case where the reagent is able to inhibit release of LDL-C from the receptor.

Referring to FIG. 4, in a random distribution, E % is dependent on acceptor levels but is independent of D:A. In a clustered distribution, on the other hand, E % is independent of acceptor levels and is negatively dependent of D:A.

In another embodiment, FRET imaging is used to test the effect of endocytic pH, cholesterol transport and LDL-R degradation on LDL-R recycling and LDL-C release. Live-cell time-lapse automated FRET imaging is used to follow the dynamic changes in the organization of LDL-R and LDL-C during endocytic trafficking in different cell types in the presence or absence of PCSK9 and reagents that disrupt endocytic pH (e.g. BafA1) or cholesterol transport (e.g. GW707 & statins). Different LDL-R and PCSK9 mutants are used to characterize the relationship between endocytic pH (e.g. LDL-R His mutants) and LDL-R degradation (e.g. LDL-R D310E and PCSK9 gain or loss of function mutants) on the LDL-C release step and/or LDL-R recycling. Comparing the FRET time-lapse data between early and late endocytic compartments, differences in dynamics and organization are measured.

In another embodiment of the invention, live-cell FRET is performed on endogenous LDL-R to address clustering in native conditions and on cells overexpressing wild-type and mutant human LDL-R. Cells are infected with adenoviruses expressing: α-galactosidase (Ad β Gal) as a control; LDL-R Y807A mutant that fails to localize in clathrin-coated pits due to its inability to bind the adaptor ARH (25) (negative clustering control at the cell surface); LDL-R containing three mutations, H562Y, H586Y or H190Y, which binds LDL-C but cannot undergo low-pH induced release; this LDL-R mutant shows a reduced ability to recycle back to the plasma membrane (positive clustering control) (6, 49). Another important LDL-R mutant is the LDL-R D310E, which abolishes the binding of PCSK9 to LDL-R (PCSK9 negative control) (59).

Doxycycline is added during the infection period to repress the target protein. To control induction and repression of protein expression, immunoblots of cell lysates are probed with anti-overexpressed proteins. Levels of protein can be regulated by the concentration of doxycline, amount of virus, and length of time after removal of doxycline. High levels of expression are avoided to reduce toxicity (3, 4).

In another embodiment, a slightly modified version of the internalization protocols is used. Ligands are internalized for 5 min at 37° C., washed and chased at 37° C. for different periods of time (22). This internalization protocol is assayed for the fluorescence co-localization of LDL-C with several endocytic membrane and fluid-phase markers (34, 58) to discriminate between distinct, although partially overlapping, endocytic compartments, early sorting vs. late endosomal compartments. For example, antibodies against alpha-adaptin, β2-adaptin, an Aβ-2 component, clathrin heavy chain and ARH are used as markers for clathrin-mediated endocytosis; anti-EEA1, anti-Rab4, anti-Rab5 and anti-Tfn-R are used as markers for the early/sorting endosomes and for late endosomes, anti-Lamp-1, anti-Rab7 and anti-CI-MPR are used. Fluorescently-labeled dextran conjugates are used as fluid-phase markers to colocalize with soluble LDL-C particles.

To assay cholesterol trafficking, in one embodiment of the present invention, intracellular cholesterol is stained with filipin, a specific fluorescent marker of unesterified cholesterol. A positive filipin staining in treated cells compared to that of untreated cells suggests that those reagents induce the intracellular accumulation of cholesterol. Co-localization of the filipin staining with endosomal markers would confirm that endocytosed cholesterol accumulates in the endosomal/lysosomal pathway (47). LDL-R expression is tested by using a cell line overexpressing LDL-R such as HepG2 transfected with a vector containing the human LDL-R promoter coupled to a reporter gene, e.g. firefly luciferase. To confirm the effects of the different reagents on the mRNA levels of genes whose expression is regulated by cholesterol, real-time PCR (RT-PCR) is used to quantitate LDL-R and HMGCoA reductase mRNA levels; GAPDH is used as a control gene. The uptake of LDL-C-DiI is assayed by internalizing LDL-C-DiI at different amounts for different periods of time. Fluorescent dye is quantified intracellularly as well as in the extracellular media. LDL-R recycling is assayed by determining the level of LDL-R recycled back to the surface after internalization, using surface biotinylation, anti-LDL-R immunoprecipitation and detection of biotin levels in the LDL-R immunoprecipitates after different internalization periods of time.

Cells are subjected to live-cell time-lapse automated FRET imaging to follow LDL-R and LDL-C over different periods of time during the 37° C. chase step using a thermal controlled chamber and a 60× water immersion lens. Images are acquired at scan speeds of 1-5 frame/second using the Zeiss 510 META laser scanning microscope. The multi-tracking and the line-by-line scan functions are used to minimize photobleaching, maximize resolution and increase speed of image collection. Other imaging conditions may also be altered: 512×512 or 256×256 pixel resolution; variable laser power, gain levels; zoom and image cropping. The image processing necessary to the FRET technology has been automated and standardized to accelerate the data analysis and allow for the development of high-content drug screening assays.

Automated FRET technology can provide several different results when assaying the LDL-R and LDL-C trafficking. As a general rule, dependency or independency of E % levels from Acceptor levels indicates a random vs. a clustered organization. As shown in FIG. 5, a random organization of LDL-R-LDL-C complexes is detected at the plasma membrane upon binding of LDL-C to LDL-R A clustered organization at early endocytic steps suggests that cholesterol-containing LDL-R-LDL complexes have been internalized into endosomes. Clustered E % together with increased internalization and recycling of LDL-R-LDL-C complexes, should lead to higher LDL-C and cholesterol uptake. Clustered E % may also result from decreased LDL-R-PCSK9 binding, and therefore reduced LDL-R degradation and possible higher levels of LDL-R recycling, leading to higher LDL-C and cholesterol uptake (48).

A clustered organization throughout the endocytic steps may be due to a blockage of the LDL-C release from LDL-R. The intracellular levels of LDL-R may depend on the ability of LDL-R-LDL-C complexes to recycle back to the plasma membrane. Clustered E % levels together with normal or low LDL-R-LDL-C recycling, may lead to increased intracellular clustering of LDL-R-LDL-C complexes and subsequent sequestration of cholesterol in endocytic recycling compartments and up-regulation of LDL-R expression; for example, BafA1 and LDL-R H is mutants (6; 49). Clustered E % together with increased LDL-R-LDL-C recycling may lead to lower intracellular cholesterol levels, since LDL-C recycles back to the plasma membrane while remaining bound to LDL-R.

A random distribution in the early endocytic steps may be due to random interactions either among LDL-C particles or LDL-R-LDL-C complexes. LDL-R expression levels and its ability to recycle back to the plasma membrane should discriminate between randomly localized LDL-C and LDL-R-LDL-C complexes at the early endocytic steps. A random distribution together with increased LDL-R recycling and expression levels suggest that LDL-C is being released from LDL-R in the early endosomes, leading to an increased LDL-R recycling as well as higher LDL-C and cholesterol uptake. A random distribution together with low levels of LDL-R expression and recycling suggest that LDL-C release is occurring in the early endosomes, followed by LDL-R binding to PCSK9. As a result, high levels of LDL-R degradation and reduced levels of LDL-C uptake should be detected.

Although unlikely since clustering is required for internalization, a random distribution together with a decreased LDL-R recycling, in the presence of high levels of LDL-R expression, suggests a significant disruption of LDL-R and LDL-C trafficking due to the inability of LDL-R-LDL-C to cluster in the early endosomes. It is important to mention that receptor clustering has been shown to be essential to the ability of receptors to traffic across the cells to their correct destination.

The goal of the present invention is to provide a mechanism for identifying a new class of therapeutic agents that may increase LDL-R expression and reduce LDL-C plasma levels by altering LDL-R, LDL-C and/or PCSK9 trafficking. These alternative therapeutics at the level of LDL-C trafficking can complement statins; in particular if they can avoid their harmful long-term effects (40). The use of automated FRET imaging of LDL-R and LDL-C trafficking in high-content drug screening assays should lead to the discovery of novel drugs that may act as described below:

Antagonists to the LDL-C release from LDL-R: Up-regulate the expression of LDL-R at the plasma membrane by sequestrating cholesterol away from the ER. These drugs should block the ability of LDL-C to be released from LDL-R, leading to an increased clustering of LDL-R-LDL-C complexes throughout the endocytic pathway, e.g. BafA1 (FIGS. 7-8).

These drugs may act as statin-like agents to disrupt cholesterol trafficking leading to LDL-R up-regulation without the harmful HMG-coA reductase inhibitor long-term effects (10, 11, 28, 40). These drugs may reduce cholesterol-induced toxicity in atherosclerotic plaques (45). These drugs may reduce the affinity of LDL-R towards PCSK9 and therefore reduce the LDL-R degradation.

Agonists for the LDL-C release from LDL-R: Bypass deficient LDL-R up-regulation to induce faster or increased LDL-R recycling for quicker or increased LDL-C clearing and cholesterol uptake without increasing LDL-R degradation. These drugs should increase the ability of LDL-C to be released from LDL-R after the internalization of LDL-R-LDL-C complexes into the endocytic system. As a result, LDL-C particles will show a random distribution in the early endocytic steps and LDL-R will recycle back to the surface.

We can focus on these types of drugs since their FRET imaging assay phenotype has been well characterized.

The method of the present invention can be completely automated, thereby making it suitable for high throughput screening.

Cell manipulations To implement automated procedures, a Rapid Plate liquid handling system is used. The liquid-handling robots are used to seed 96-well plates with an adequate number of cells per well. The cells are incubated overnight in at 37° C./5% $CO_2$. The next day the serum-containing media is replaced by Hepes-buffered, BSA-containing media at 37° C. for 30 min. Then, LDL-C-BODIPY and LDL-C-DiI is added to the cells for different periods of time (5-8 min or 20-30 min) at 37° C. to allow for LDL-C internalization to occur. Compounds to be tested should be added during the pre-internalization step as well as during the internalization step. The assay is then stopped by washing and adding a 4% paraformaldehyde cell fixation solution, since cell fixation does not affect receptor clustering behavior (51; 54). Importantly, automated FRET imaging requires only "mix and measure" steps, as it is preferable for high-content drug screening assays.

Image collection. For the 96-well protocol, the fixed cells are imaged in a Zeiss 510METALSM confocal microscope at room temperature, as described above (38; 51; 54). To increase the collection and processing speed and still achieve the best image quality possible within a reasonable time frame, the number of cells/image is increased by collecting images at different microscopy settings, such as 40×1.2 NA water lens, 256×256 pixel resolution, zoom 1×; further optimization will require the use of low NA air lenses.

Image processing & analysis. For the 96-well protocol, images are processed using the integrated ImageJ plugin, as described above. Using our current algorithm and two DELL workstations, it is possible to process ~250-300 images overnight, corresponding to 2-3 images/well for one 96-well microplate. Processed images do not have to be stored, since the original LSM Zeiss images and the Excel data file (including ROI coordinates as well as FRET data) is all that is needed to analyze the FRET assay. For a 96-well plate collecting 2-3 images/well, ~9-11 GB (original LSM images plus Excel data files) is stored in a local server (498 GB total).

Signal to background ratio and reproducibility. Since the background level of automated FRET assays is ~5% and the average E % level in different experiments is ~20-40%, these assays are well within the expected signal to background ratio. Differences between control and treated cells in the order of >5% have been statistically determined, indicating the high sensitivity of the FRET imaging assay (51). The automated FRET imaging assay shows reproducible and consistent results and has demonstrated the effect of a 100 nM concentration of a pharmacologically active reagent (BafA1) (28). Such reproducibility and reliability is probably due to the homogenous expression levels of LDL-R endogenously expressing cells and to the strong sensitivity and specificity of the FRET assay using labeled LDL-C ligands.

Toxicity. Clustered and random distribution controls with compound treatment will provide a way to identify and remove any potential toxicity and fluorophore effects, which may lead to very low or very high fluorescence intensity of one or both fluorophores, resulting in saturated donor or acceptor levels, or in very high or very low D/A ratios. These results will be automatically removed from the usable data and will immediately disqualify a potential hit. We will test the DMSO tolerance effect in this assay; however, other receptor-ligand trafficking assays have been shown to tolerate up to 5% of DMSO (5).

Potential outputs. For the 96-well protocol, data will be analyzed as described for the automated FRET imaging assay using two well-characterized FRET control parameters to discriminate random "molecular crowding" from clustered distributions. As a random control, LDL-C-BODIPY/LDL-C-DiI are bound to a polylysine substrate (FIG. 3); as a clustered distribution control, ALEXA FLUOR 488-Tfn/ALEXA FLUOR 555-Tfn are bound to TFR, a well-known homo-dimeric membrane-bound receptor, at the plasma membrane in cells (FIG. 2) (51). The correlation coefficient value, r-value, has been determined as the most statistical significant value to distinguish random (r<0.5) vs. clustered distributions (r≥0.5) (51; 54; 55).

Hit selection and counterscreens. Counterscreens are important to demonstrate the specificity of the primary screen hits, so that they do not affect general cellular pathways such as endocytosis and recycling, but are targeted specifically to affect LDL-dependent events during endocytic trafficking. Selective hits should show an effect on the primary screen but not on the random or clustered control screens, which act as counter-screens. Tfn uptake assays will be used as a third counterscreen to show that selective hits do not affect the general pathways of endocytosis and recycling (21). Selective hits, which show high selectivity and potency to decrease the risk of off-target side effects, are then re-tested a second time, independently of the first assay, on a different day. If a compound exhibits the same activity within a statistically significant range, it can proceed to dose-response screening and it is named a confirmed hit, ready to be tested in secondary screens for identification of mechanism of action (MOA).

Confirmed hits and secondary hits. Confirmed hits will then be subjected to secondary screens, which have been described above in Specific Aim 1 (cholesterol transport, LDL-R expression, LDL-C uptake and LDL-R recycling). LDL-based secondary screens will be performed only on confirmed hits that show positive and increased filipin staining, do not affect the counterscreens and do not show toxic or fluorophore effects. Interesting compounds to pursue for further testing should show significant increase in LDL-R expression as well as LDL-C uptake. Furthermore, these hits can be tested for the ability of LDL-C to be sequestered in the recycling compartments (positive for co-localization with Tfn-R), when for example, LDL-C is internalized for 30 min and it shows a clustered organization. Confirmed hit drugs should be pursued further to test their effect on overall cholesterol homeostasis in disease models of atherosclerosis and heart disease.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

EXAMPLES

Culture of MDCK Cells on Filter Inserts

MDCK cells were grown to confluence in 100-mm cell culture dishes, trypsinized, centrifuged, and resuspended in DMEM/10% fetal bovine serum/Pen-Strep. Approximately 300,000 cells were placed on top of an inverted Transwell Clear insert (Corning Costar, Cambridge, Mass.), which allowed for their direct visualization through a coverslip using an inverted microscope. After 3-4 days in culture, the fully polarized monolayer was immediately used according to internalization protocols. Cellular polarity was established by the reduced apical uptake and basolateral staining of apically internalized fluorophore-labeled Tfn (<5%), using confocal microscopy.

Fluorophore-Labeled Ligands

BODIPY- and DiI-labeled LDL was obtained from Invitrogen (Carlsbad, Calif.).

Internalization of Fluorophore-labeled Ligands

Inserts with a fully polarized MDCK cell monolayer were washed with PBS, equilibrated with MEM/HEPES/BSA at 37° C., and pretreated 15 min with or without 10 μM Bafilomycin A1 (BafA1) (Sigma, St. Louis, Mo.). Then, these cells were internalized for 30 min at 37° C. with different amounts of BODIPY LCL-C ligands and DiI-LDL-C from the basolateral and/or apical PM in the presence or absence of 10 μM BFA.

Cells may be washed and fixed with 4% paraformaldehyde/phosphate-buffered saline (PBS), as described previously (Barroso and Sztul, 1994; Wallrabe et al., 2003a,b, 2006). For live cells, the protocol was exactly the same, except that each insert followed the regimen individually and was imaged immediately at room temperature. As a positive control for random distribution of substrate-bound proteins, ALEXA FLUOR 488-Tfn and ALEXA FLUOR 555-Tfn were incubated for 30 min at room temperature onto polylysine-coated glass coverslips, fixed with 4% paraformaldehyde, washed in PBS, and imaged within 48 h using confocal microscopy. As a positive control for membrane protein clustering, ALEXA FLUOR 488-Tfn and ALEXA FLUOR 588-Tfn were internalized for 30 min at 37° C. into polarized MDCK cells, as described previously (Wallrabe et al., 2006).

For FRET assay purposes (filter-bound cells or polylysine-bound coverslips), three different samples were used: double-labeled specimens, containing D- and A-labeled ligands (pIgA-R and/or Tfn) and two single-label specimens containing either D- or A-labeled ligands; the single-label reference samples were used to establish spectral-bleedthrough (SBT) levels.

Laser Scanning FRET Microscopy

Polarized MDCK cells were incubated with Bodipy-LDL-C for 2 hours at 4° C. with or without BafA1, and then at 37° C. for 5-8 min and 20-30 min and then prepared for imaging. For data collection, the specimen was positioned in a small chamber created by a coverslip between two metal rings, filled with a small amount of PBS (fixed cells) or MEM/HEPES/BSA media (live cells) and placed on the microscope stage. Cells were visualized using a Zeiss 510META LSM confocal microscope (Thornwood, N.Y.), with 63×1.4 NA oil lens, 512×512 pixel resolution, no filter.

Data Collection

Two-color Z-series with a 0.5-µm vertical step were collected to check cell height (10-15 µm) and to select focal planes at different cell heights. Optimal PMT and accumulation settings and laser power levels were established in a pre-FRET-acquisition phase. With the zoom setting at ~2×, images of the doubled-labeled specimen were taken with the Green HeNe laser, 543-nm excitation, i.e. acceptor excitation, and the acceptor emission channel (LP590 nm) followed by imaging with the argon laser 488-nm excitation, i.e., donor excitation, and the donor (515/30 nm) or the acceptor (LP590 nm) emission channels. The single-labeled acceptor specimen followed the same protocol. The image of the single-labeled donor specimen at acceptor excitation wave-length was collected to verify the instrument cross-talk in both channels. Images of all three types of specimen were taken under identical imaging conditions; PMT gain and black-level were set at identical values to collect data simultaneously in both channels into 1024×1024- or 512×412-pixel eight-bit images. Bleaching was undetectable during the short exposure to collect the final image. The Bio-Rad Radiance 2100 confocal system was used for live cell image acquisition. A custom macro was used to toggle between donor and acceptor excitation lasers and thus minimize the delay in switching lasers. The Nikon PCM2000 microscopes were used to collect images from fixed cells.

Postacquisition Data Generation

First, images were background-subtracted and processed by PFRET software, which removed donor and acceptor SBT pixel-by-pixel on the basis of matched fluorescence levels between the double-label specimen and single-label reference specimens, using seven images; two single-label donor reference images (donor excitation/donor channel and acceptor channel); two single-label acceptor reference images (donor and acceptor excitation, both in the acceptor channel); three double-label images (donor excitation/donor and acceptor channel, acceptor excitation/acceptor emission. Elangovan et al., 2003; Wallrabe et al., 2003a,b). The three double-labeled images were named as follows: quenched donor (qD), i.e., the donor excitation/donor emission; acceptor (A), i.e., acceptor excitation/acceptor emission; and uncorrected FRET (uFRET), i.e., donor excitation/acceptor emission. The pixel-by-pixel correction used to generate the processed FRET (PFRET) image was actually based on the average value of narrow fluorescence rangers, for more efficient running of the correction algorithm (Elangovan et al., 2003). In our case, we chose the average of 12 florescence units per range, i.e., 0-12, 13-24 etc. continuing to the highest fluorescent units in the image. Using the average of even narrower ranges did not improve the sensitivity.

Postacquisition Data Analysis

E % is an expression of the energy transfer as a percentage of the unquenched donor, d=qD+γ PFRET, as described in the following equation: E %+100·(γ·PFRET)/D, i.e., E %=100·1−(qD/D) (Elangovan et al., 2003; Wallrabe et al., 2003a, 2006; Bonamy et al., 2005; Wallrabe and Barroso, 2005). The γ factor, which is a function of the quantum yield of the fluorophores and the spectral sensitivity of the detection setup, plays a crucial role in recording precise E % and distances between fluorophores. Because the excitation efficiencies ($\epsilon$), quantum yields of the fluorophore molecules and the detection efficiencies (Q) remain constant throughout the experiments, and the γ factor does not affect the answers that FRET-based clustering analysis seeks. for simplicity we used γ=1, as described previously (Elangovan et al., 2003; Wallrabe et al., 2003ab, 2006). Nevertheless, different microscopes using different imaging collection instruments and settings will by definition have distinct γ factors. Therefore, the relative E % values differ for data collected using distinct microscope systems.

A custom-written analysis program was able to select pixels of the eight-bit gray-scale fluorescence intensities of uFRET, A and qD images ranging between 0 at the lower bound and at the higher bound one below [255 minus background value] to exclude any saturated pixels. Under our imaging conditions, there were very few saturated pixels (Wallrabe et al., 2003a, 2006). Then, appropriate regions of interest (ROIs) were visually selected from the uFRET image. These ROIs were subsequently applied to the other images to extract the fluorescence values. The values which include PFRET (actual energy transfer levels as per the PFRET SBT correction algorithm), qD and A levels were transferred to an Excel spreadsheets (Microsoft, Redmond, Wash.) for calculation of additional parameters such as E %, D, and D/A ratios. These values were averaged over ROIs containing 50-500 pixels. For further FRET clustering analysis, E % values that correspond to A or D values of 10-80 Gy-scale units per pixel were selected to avoid the noise of very high or very low A or D florescence intensities on E % and to exclude outlier values (<5%), i.e. individual values that lie outside the overall observed range (Bhatia et al., 2005; Wallrabe et al., 2006).

Statistical Analysis

To provide insights as to whether E % is affected by increasing levels of A at specific D/A ranges, the data were arranged into several D/A and A ranges. For D/A ranges, we used the following ranges:

$$D/A \approx 1 \in \left[\frac{1}{\sqrt{2}}; \sqrt{2}\right[$$

and D/A≈2∈[√2;2·√2[, which corresponds to categories with a twofold increase, centered around 1 and 2, respectively. Thus D/A ~1 ranged from D/A values of 0.7-1.4, whereas D/A ~2 ranged from values of 1.4-2.8. In bar charts, the gray-scale intensity cohorts for A were defined by splitting in three the range defined by the lowest and highest value of A (Low=[20; 40], Medium=[40; 60], High=[60; 80]). This approach can only be used to compare E % values for different data sets that show overlap between the high, medium and high ranges of A.

To statistically analyze whether or not E % was dependent of the level of A at specific D/A ranges, we used the correlation coefficients (r value) and the slope (s values) as indicators. The closer the r values are to 0, the less E % is dependent on A levels; the closer r values are to 1, the more E % depends on A levels. Another important parameter to determine whether E % depends on A levels is the slope of the linear regression, because a slope close to zero may have a high correlation, but suggest that E % does not depend on A. To analyze whether the E % cohorts at different A levels (10-19, 20-29, 30-39, 40-49, etc.) were significantly different or not, we used the NOVA with a single-factor analysis from the Excel data analysis software package to establish p values between groups; significance of the statistic differences between the groups was indicated by p<0.001.

To compare different data sets (for example, treated and untreated with treatment or different endosome groups), we did an NCOVA using [R] to assess whether the treatment (alone) has an effect or not on the distribution. In a first model, we verified that the treatment did not significantly modify the slope of E %=f(A) (cf. p value for A×Variable in Table 2). Then, in a reduced model, where the data are fitted with a common slope, we assessed whether the treatment had an effect affected, by testing if the intercept at the origin was modified. It is important to stress that directly comparable data sets were collected and processed under identical microscopy settings and FRET conditions; data sets that are not collected and processed under identical microscopy settings and FRET conditions were not directly compared. The combination of correlation coefficients, slope values, and ANOVA and ANCOVA analyses allows us to make some powerful deductions about the nature of the distribution of receptor-ligand complexes in endocytic membranes (Wallrabe et al., 2003a,b, 2006).

The following references are provided as background information for the invention disclosed herein. Those references that may be material to patentability are cited separately in an Information Disclosure Citation.

REFERENCES

1. Abifadel M, Varret M, Rabes J P, Allard D, Ouguerram K, Devillers M, Cruaud C, Benjannet S, Wickham L, Erlich D, Derre A, Villeger L, Farnier M, Beucler I, Bruckert E, Chambaz J, Chanu B, Lecerf J M, Luc G, Moulin P, Weissenbach J, Prat A, Krempf M, Junien C, Seidah N G and Boileau C. Mutations in PCSK9 cause autosomal dominant hypercholesterolemia. *Nat Genet.* 34: 154-156, 2003.
2. Allard D, Amsellem S, Abifadel M, Trillard M, Devillers M, Luc G, Krempf M, Reznik Y, Girardet J P, Fredenrich A, Junien C, Varret M, Boileau C, Benlian P and Rabes J P. Novel mutations of the PCSK9 gene cause variable phenotype of autosomal dominant hypercholesterolemia. *Hum Mutat* 26: 497, 2005.
3. Altschuler Y, Barbas S M, Terlecky L J, Tang K, Hardy S, Mostov K E and Schmid SL. Redundant and distinct functions for dynamin-1 and dynamin-2 isoforms. *J Cell Biol* 143: 1871-1881, 1998.
4. Altschuler Y, Liu S, Katz L, Tang K, Hardy S, Brodsky F, Apodaca G and Mostov K. ADP-ribosylation factor 6 and endocytosis at the apical surface of Madin-Darby canine kidney cells. *J Cell Biol* 147: 7-12, 1999.
5. Barroso M and Sztul E S. Basolateral to apical transcytosis in polarized cells is indirect and involves BFA and trimeric G protein sensitive passage through the apical endosome. *J Cell Biol* 124: 83-100, 1994.
6. Beglova N, Jeon H, Fisher C and Blacklow S C. Cooperation between fixed and low pH-inducible interfaces controls lipoprotein release by the LDL receptor. *Mol Cell* 16: 281-292, 2004.
7. Brown M S and Goldstein J L. How LDL receptors influence cholesterol and atherosclerosis. *Sci Am* 251: 58-66, 1984.
8. Brown M S and Goldstein J L. A receptor-mediated pathway for cholesterol homeostasis. *Science* 232: 34-47, 1986.
9. Brown M S and Goldstein J L. Lipoprotein receptors: therapeutic implications. *J Hypertens Suppl* 8: S33-S35, 1990.
10. Brown M S and Goldstein J L. Lowering plasma cholesterol by raising ldl receptors. 1981. *Atheroscler Suppl* 5: 57-59, 2004.
11. Brown M S and Goldstein J L. Biomedicine. Lowering LDL—not only how low, but how long? *Science* 311: 1721-1723, 2006.
12. Brown M S, Herz J and Goldstein J L. LDL-receptor structure. Calcium cages, acid baths and recycling receptors. *Nature* 388: 629-630, 1997.
13. Carpentier J L, Gorden P, Goldstein J L, Anderson R G, Brown M S and Orci L. Binding and internalization of 1251-LDL in normal and mutant human fibroblasts. A quantitative autoradiographic study. *Exp Cell Res* 121: 135-142, 1979.
14. Cassio D, Hamon-Benais C, Guerin M and Lecoq O. Hybrid cell lines constitute a potential reservoir of polarized cells: isolation and study of highly differentiated hepatoma-derived hybrid cells able to form functional bile canaliculi in vitro. *J Cell Biol* 115: 1397-1408, 1991.
15. Cohen J C, Boerwinkle E, Mosley T H, Jr. and Hobbs H H. Sequence variations in PCSK9, low LDL, and protection against coronary heart disease. *N Engl J Med* 354: 1264-1272, 2006.
16. Elangovan M, Wallrabe H, Chen Y, Day R N, Barroso M and Periasamy A. Characterization of one- and two-photon excitation fluorescence resonance energy transfer microscopy. *Methods* 29: 58-73, 2003.
17. Fisher T S, Lo S P, Pandit S, Mattu M, Santoro J C, Wisniewski D, Cummings R T, Calzetta A, Cubbon R M, Fischer P A, Tarachandani A, De Francesco R, Wright S D, Sparrow C P, Carfi A and Sitlani A. Effects of pH and low density lipoprotein (LDL) on PCSK9-dependent LDL receptor regulation. *J Biol Chem* 282: 20502-20512, 2007.
18. Garcia C K, Wilund K, Arca M, Zuliani G, Fellin R, Maioli M, Calandra S, Bertolini S, Cossu F, Grishin N, Barnes R, Cohen J C and Hobbs H H. Autosomal recessive hypercholesterolemia caused by mutations in a putative LDL receptor adaptor protein. *Science* 292: 1394-1398, 2001.
19. Garuti R, Jones C, Li W P, Michaely P, Herz J, Gerard R D, Cohen J C and Hobbs H H. The modular adaptor protein ARH promotes LDLR clustering into clathrin-coated pits. *J Biol Chem* 2005.
20. Genschel J, Dedoussis G V and Schmidt H H. LDL-receptor mutations in Europe. *Hum Mutat* 26: 277-278, 2005.
21. Ghosh R N, Chen Y T, DeBiasio R, DeBiasio R L, Conway B R, Minor L K and Demarest K T. Cell-based, high-content screen for receptor internalization, recycling and intracellular trafficking. *Biotechniques* 29: 170-175, 2000.
22. Ghosh R N, Gelman D L and Maxfield F R. Quantification of low density lipoprotein and transferrin endocytic sorting HEp2 cells using confocal microscopy. *J Cell Sci* 107 (Pt 8): 2177-2189, 1994.
23. Ghosh R N and Webb W W. Automated detection and tracking of individual and clustered cell surface low density lipoprotein receptor molecules. *Biophys J* 66: 1301-1318, 1994.
24. Goldstein J L, Anderson R G and Brown M S. Coated pits, coated vesicles, and receptor-mediated endocytosis. *Nature* 279: 679-685, 1979.
25. He G, Gupta S, Yi M, Michaely P, Hobbs H H and Cohen J C. ARH is a modular adaptor protein that interacts with the LDL receptor, clathrin, and AP-2. *J Biol Chem* 277: 44044-44049, 2002.
26. Horton J D, Cohen J C and Hobbs H H. Molecular biology of PCSK9: its role in LDL metabolism. *Trends Biochem Sci* 32: 71-77, 2007.
27. Issandou M. Pharmacological regulation of low density lipoprotein receptor expression: current status and future developments. *Pharmacol Ther* 111: 424-433, 2006.
28. Issandou M, Guillard R, Boullay A B, Linhart V and Lopez-Perez E. Up-regulation of low-density lipoprotein receptor in human hepatocytes is induced by sequestration of free cholesterol in the endosomal/lysosomal compartment. *Biochem Pharmacol* 67: 2281-2289, 2004.
29. Jeon H and Blacklow S C. Structure and physiologic function of the low-density lipoprotein receptor. *Annu Rev Biochem* 74: 535-562, 2005.
30. Kong W J, Liu J and Jiang J D. Human low-density lipoprotein receptor gene and its regulation. *J Mol Med* 84: 29-36, 2006.
31. Lilly S M and Rader D J. New targets and emerging therapies for reducing LDL cholesterol. *Curr Opin Lipidol* 18: 650-655, 2007.
32. Maxfield F R and McGraw T E. Endocytic recycling. *Nat Rev Mol Cell Biol* 5: 121-132, 2004.
33. Morrison I E, Anderson C M, Georgiou G N, Stevenson G V and Chemy R J. Analysis of receptor clustering on cell surfaces by imaging fluorescent particles. *Biophys J* 67: 1280-1290, 1994.
34. Mousavi S A, Malerod L, Berg T and Kjeken R. Clathrin-dependent endocytosis. *Biochem J* 377: 1-16, 2004.
35. Nagai M, Meerloo T, Takeda T and Farquhar M G. The adaptor protein ARH escorts megalin to and through endosomes. *Mol Biol Cell* 14: 4984-4996, 2003.
36. Naoumova R P, Thompson G R and Soutar A K. Current management of severe homozygous hypercholesterolaemias. *Curr Opin Lipidol* 15: 413-422, 2004.
37. Olofsson S O and Boren J. Apolipoprotein B: a clinically important apolipoprotein which assembles atherogenic lipoproteins and promotes the development of atherosclerosis. *J Intern Med* 258: 395-410, 2005.
38. Periasamy A, Wallrabe H, Chen Y and Barroso M. Quantitation of Protein-Protein interactions: Confocal FRET Microscopy. *Methods Cell Biol* In Press: 2007.
39. Rashid S, Curtis D E, Garuti R, Anderson N N, Bashmakov Y, Ho Y K, Hammer R E, Moon Y A and Horton J D. Decreased plasma cholesterol and hypersensitivity to statins in mice lacking Pcsk9. *Proc Natl Acad Sci USA* 102: 5374-5379, 2005.
40. Rutishauser J. The role of statins in clinical medicine—LDL—cholesterol lowering and beyond. *Swiss Med Wkly* 136: 41-49, 2006.
41. Sanan D A, van der Westhuyzen D R, Gevers W and Coetzee G A. Early appearance of dispersed low density lipoprotein receptors on the fibroblast surface during recycling. *Eur J Cell Biol* 48: 327-336, 1989.
42. Sirinian M I, Belleudi F, Campagna F, Ceridono M, Garofalo T, Quagliarini F, Verna R, Calandra S, Bertolini S, Sorice M, Torrisi M R and Arca M. Adaptor protein ARH is recruited to the plasma membrane by low density lipoprotein (LDL) binding and modulates endocytosis of the LDL/LDL receptor complex in hepatocytes. *J Biol Chem* 280: 38416-38423, 2005.
43. Soccio R E and Breslow J L. Intracellular cholesterol transport. Arterioscler *Thromb Vasc Biol* 24: 1150-1160, 2004.
44. Soutar A K, Naoumova R P and Traub L M. Genetics, clinical phenotype, and molecular cell biology of autosomal recessive hypercholesterolemia. *Arterioscler Thromb Vasc Biol* 23: 1963-1970, 2003.
45. Stoll G and Bendszus M. Inflammation and atherosclerosis: novel insights into plaque formation and destabilization. *Stroke* 37: 1923-1932, 2006.
46. Sugii S, Lin S, Ohgami N, Ohashi M, Chang CC and Chang T Y. Roles of endogenously synthesized sterols in the endocytic pathway. *J Biol Chem* 281: 23191-23206, 2006.
47. Sugii S, Reid P C, Ohgami N, Du H and Chang T Y. Distinct endosomal compartments in early trafficking of low density lipoprotein-derived cholesterol. *J Biol Chem* 278: 27180-27189, 2003.
48. Talati R and Barroso M. Automated FRET assay measures the organization of LDL particles during the endocytic trafficking. *J Histochem and Cytochem* in preparation: 2007.
49. Van Hoof D, Rodenburg K W and Van der Horst D J. Intracellular fate of LDL receptor family members depends on the cooperation between their ligand-binding and EGF domains. *J Cell Sci* 118: 1309-1320, 2005.
50. Verhulst A, D'Haese P C and De Broe M E. Inhibitors of HMG-CoA reductase reduce receptor-mediated endocytosis in human kidney proximal tubular cells. *J Am Soc Nephrol* 15: 2249-2257, 2004.
51. Wallrabe H, Bonamy G, Periasamy and Barroso M. Receptor Complexes Cotransported via Polarized Endocytic Pathways Form Clusters with Distinct Organizations. *Mol Cell Biol* 18: 2226-2243, 2007.
52. Wallrabe, H. and Barroso, M. FRET reveals the organization of different receptor-ligand complexes (polymeric IgA-R and Transferrin-R) in endocytic membranes of polarized MDCK cells. So, P. T. and Periasamy, A. Multiphoton Microscopy in the Biomedical Sciences. Proc. SPIE; Vol. 5323, 44-51. 2004.
53. Wallrabe H and Barroso M. Confocal FRET microscopy: Study of Clustered Distribution of Receptor-ligand complexes in Endocytic Membranes. In: Molecular Imaging: FRET microscopy and Spectroscopy, edited by Periasamy A and Day RN. New York: Oxford University Press, 2005, p. 95-111.
54. Wallrabe H, Chen Y, Periasamy A and Barroso M. Issues in confocal microscopy for quantitative FRET analysis. *Microsc Res Tech* 69: 196-206, 2006.
55. Wallrabe H, Elangovan M, Burchard A, Periasamy A and Barroso M. Confocal FRET microscopy to measure clustering of ligand-receptor complexes in endocytic membranes. *Biophys J* 85: 559-571, 2003.
56. Wallrabe H and Periasamy A. Imaging protein molecules using FRET and FLIM microscopy. *Curr Opin Biotechnol* 16: 19-27, 2005.
57. Wallrabe H, Stanley M, Periasamy A and Barroso M. One- and two-photon fluorescence resonance energy transfer microscopy to establish a clustered distribution of receptor-ligand complexes in endocytic membranes. *J Biomed Opt* 8: 339-346, 2003.
58. Watson P, Jones AT and Stephens D J. Intracellular trafficking pathways and drug delivery: fluorescence imaging of living and fixed cells. *Adv Drug Deliv Rev* 57: 43-61, 2005.
59. Zhang D W, Lagace T A, Garuti R, Zhao Z, McDonald M, Horton J D, Cohen J C and Hobbs H H. Binding of proprotein convertase subtilisin/kexin type 9 to epidermal growth factor-like repeat A of low density lipoprotein receptor decreases receptor recycling and increases degradation. *J Biol Chem* 282: 18602-18612, 2007.
60. Zhang J, Dudley-Rucker N, Crowley J R, Lopez-Perez E, Issandou M, Schaffer J E and Ory D S. The steroidal analog GW707 activates the SREBP pathway through disruption of intracellular cholesterol trafficking. *J Lipid Res* 45: 223-231, 2004.

What is claimed is:
1. A method for screening compounds that inhibit intracellular release of low density lipoprotein-cholesterol (LDL-C) from a LDL receptor (LDL-R), the method comprising the steps:

a) providing a monolayer of cells that have LDL-R in the plasma membrane (PM) of said cells;
b) in the presence of a compound to be tested, incubating said cells with a first population of LDL-C that is labeled with a donor fluorophore (D) and a second population of LDL-C that is labeled with an acceptor (A) fluorophore, for a time sufficient for binding of LDL-C to LDL-R to form a LDL-R/LDL-C complex on the surface of said cells;
c) incubating said cells for a time sufficient for internalization of the LDL-R/LDL-C complex into said cells;
d) using FRET-confocal microscopy imaging, determining intensity values for D and A and the efficiency of energy transfer (E %) to determine whether LDL-R/LDL-C complexes in the endosomal membrane have a random distribution or a clustered distribution, wherein a random distribution indicates release of LDL-C from LDL-R and a clustered distribution indicates that the compound tested inhibits LDL-C release from the LDL-R/LDL-C complex.

2. The method of claim 1, wherein said incubation time for binding is in the range of 30 minutes to three (3) hours at about 4° C.

3. The method of claim 1, wherein said incubation time for internalization is in the range of 5 minutes to 60 minutes at about 37° C.

4. The method of claim 1, wherein said cells endogenously express LDL-R.

5. The method of claim 4, wherein said cells are chosen from the group consisting of epithelial renal Madin-Darby canine kidney (MDCK) cells, human liver hepatocellular carcinoma cells, HepG2, and rat hepatoma-derived hybrid cell line, WIF-B.

6. The method of claim 5, wherein said cells are MDCK cells.

7. The method of claim 6, wherein said cells are polarized.

8. The method of claim 1, wherein said cells are transfected to express LDL-R.

9. The method of claim 1, wherein said cells are fixed following internalization but before confocal imaging.

10. The method of claim 1, wherein a correlation coefficient (r value)<0.5 indicates a random distribution and r≥0.5 indicates a clustered organization.

* * * * *